US008042003B2

(12) United States Patent
Ma et al.

(10) Patent No.: US 8,042,003 B2
(45) Date of Patent: Oct. 18, 2011

(54) METHOD AND APPARATUS FOR EVALUATING EFFECTIVENESS OF TEST CASE

(75) Inventors: Yu Seung Ma, Daejeon (KR); Duk Kyun Woo, Daejeon (KR)

(73) Assignee: Electronics and Telecommunications Research Insitute, Daejeon (KR)

( * ) Notice: Subject to any disclaimer, the term of this patent is extended or adjusted under 35 U.S.C. 154(b) by 545 days.

(21) Appl. No.: 12/155,932

(22) Filed: Jun. 11, 2008

(65) Prior Publication Data
US 2009/0077427 A1    Mar. 19, 2009

(30) Foreign Application Priority Data
Sep. 19, 2007    (KR) .................. 10-2007-0095525

(51) Int. Cl.
*G06F 11/00* (2006.01)
(52) U.S. Cl. .......... 714/38.1; 714/41; 707/722; 717/124
(58) Field of Classification Search ............ 714/38, 714/41, 38.1; 717/124; 707/722
See application file for complete search history.

(56) References Cited

U.S. PATENT DOCUMENTS

| | | | | |
|---|---|---|---|---|
| 5,345,393 | A * | 9/1994 | Ueda .................. | 716/18 |
| 5,561,762 | A * | 10/1996 | Smith et al. ............ | 714/33 |
| 5,808,919 | A * | 9/1998 | Preist et al. ............ | 702/183 |
| 5,922,079 | A * | 7/1999 | Booth et al. ............ | 714/26 |
| 6,069,610 | A * | 5/2000 | Denda et al. ........... | 345/694 |
| 6,279,122 | B1 * | 8/2001 | Hitchcock et al. ....... | 714/33 |
| 6,766,473 | B2 * | 7/2004 | Nozuyama ............. | 714/33 |
| 7,246,271 | B2 * | 7/2007 | Manley et al. .......... | 714/47.3 |
| 7,685,472 | B1 * | 3/2010 | Shibl et al. ............. | 714/38 |
| 2004/0230385 | A1 * | 11/2004 | Bechhoefer et al. ...... | 702/57 |
| 2005/0047229 | A1 * | 3/2005 | Nadeau-Dostie et al. ... | 365/201 |
| 2005/0229044 | A1 * | 10/2005 | Ball ..................... | 714/38 |
| 2005/0261859 | A1 * | 11/2005 | Petsinger .............. | 702/120 |
| 2005/0272024 | A1 * | 12/2005 | Ullman et al. .......... | 434/362 |
| 2005/0278322 | A1 * | 12/2005 | Fan et al. .............. | 707/5 |
| 2006/0117237 | A1 * | 6/2006 | Weller ................. | 714/742 |
| 2006/0136205 | A1 * | 6/2006 | Song ................... | 704/243 |
| 2006/0143540 | A1 * | 6/2006 | Burk ................... | 714/41 |
| 2007/0011540 | A1 * | 1/2007 | Schoenfeld ............ | 714/735 |
| 2007/0076593 | A1 * | 4/2007 | Sakurai et al. ......... | 370/219 |
| 2007/0089093 | A1 * | 4/2007 | Simkins ............... | 717/126 |
| 2007/0094189 | A1 * | 4/2007 | Yamamoto et al. ...... | 706/45 |

(Continued)

OTHER PUBLICATIONS

Sang Woon Kim et al., "The motivation of choosing IT new growth engine industries and their deployment strategy" Journal of Korea Information Science Society, vol. 23, No. 3, Mar. 2005, Partial.

(Continued)

*Primary Examiner* — Scott Baderman
*Assistant Examiner* — Loan Truong
(74) *Attorney, Agent, or Firm* — Staas & Halsey LLP

(57) ABSTRACT

Provided are a method and apparatus for evaluating the effectiveness of a test case used for a program test on the basis of error detection capability. The method includes: receiving a target program used for evaluating the effectiveness of the test case; generating an error program by inputting errors to the target program; detecting the errors by executing the test case on the generated error program; and calculating evaluation points of the test case using a ratio of the number of the detected errors to the number of the input errors. Thus, the capability of the test case used for a program test to detect errors can be evaluated.

2 Claims, 2 Drawing Sheets

U.S. PATENT DOCUMENTS

| | | | |
|---|---|---|---|
| 2007/0094543 A1* | 4/2007 | Joshi et al. | 714/38 |
| 2007/0174702 A1* | 7/2007 | Meyer | 714/33 |
| 2007/0266349 A1* | 11/2007 | Craig et al. | 716/4 |
| 2007/0288107 A1* | 12/2007 | Fernandez-Ivern et al. | 700/91 |
| 2008/0020746 A1* | 1/2008 | Alexandar et al. | 455/423 |
| 2008/0215925 A1* | 9/2008 | Degenaro et al. | 714/41 |
| 2008/0222608 A1* | 9/2008 | Gartner et al. | 717/124 |
| 2009/0006066 A1* | 1/2009 | Behm et al. | 703/15 |
| 2009/0070643 A1* | 3/2009 | Anvekar et al. | 714/718 |
| 2009/0210764 A1* | 8/2009 | Nozuyama | 714/737 |

OTHER PUBLICATIONS

Hoijin Yoon et al., "A test technique for the component customization failure", Journal of Korea Information Science Society, vol. 27, No. 2, Feb. 2000, Partial.

Korean Office Action issued on Mar. 26, 2009 in corresponding Korean Patent Application 10-2007-0095525.

* cited by examiner

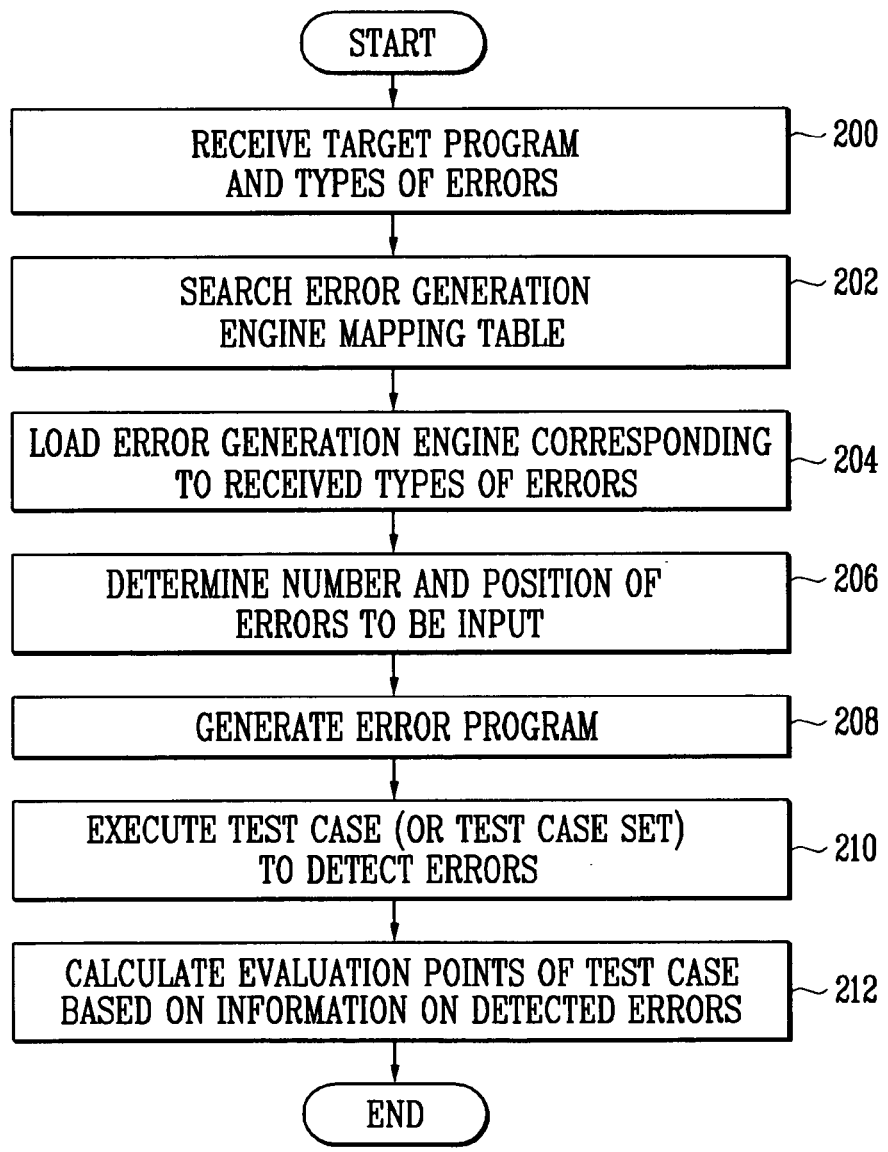

METHOD AND APPARATUS FOR EVALUATING EFFECTIVENESS OF TEST CASE

CROSS-REFERENCE TO RELATED APPLICATION

This application claims priority to and the benefit of Korean Patent Application No. 2007-95525, filed Sep. 19, 2007, the disclosure of which is incorporated herein by reference in its entirety.

BACKGROUND

1. Field of the Invention

The present invention relates to program test technology and, more particularly, to a method and apparatus for evaluating the effectiveness of a test case used for a program test.

2. Discussion of Related Art

Conventional embedded systems are mostly employed for simple repetitive work, but they have recently been applied in more various fields, for example, portable phones, automobiles, medical equipment, and various electronic devices. In addition, since the safety of embedded systems significantly affects the commercial availability of products, not only development and production processes, but also inspection processes are accepted as critical. In particular, a program test for inspecting the quality of a program (e.g., a device driver) embedded in an embedded system and a program test for inspecting the quality of hardware of the embedded system are becoming more important.

A program test includes executing test cases on a test target program and determining if the test target program is properly embodied based on the execution result. Accordingly, it is important to evaluate the effectiveness of the test case used for the program test.

However, a conventional program test is performed without evaluating the capability of a test case to detect errors. In other words, the test case is executed on a test target program irrespective of the error detection capability of the test case, so that the test case is only evaluated depending on whether the test case performs all source codes of the test target program or all branch statements of the test target program.

Especially, in the case of a device driver, content to be tested and detected errors vary with the usable environment of an embedded system including the device driver. However, since conventional evaluation systems evaluate test cases based on equal standards, it is difficult to evaluate the test cases based on specific standards appropriate for the usable environment of the device driver.

Therefore, it is necessary to develop a new technique of evaluating the error detection capability of a test case used for a program test.

SUMMARY OF THE INVENTION

The present invention is directed to a method and apparatus for evaluating the effectiveness of a test case on the basis of error detection capability.

One aspect of the present invention provides a method for evaluating effectiveness of a test case. The method includes: receiving a target program used for evaluating the effectiveness of the test case; generating an error program by inputting errors to the target program; detecting the errors by executing the test case on the generated error program; and calculating evaluation points of the test case using a ratio of the number of the detected errors to the number of the input errors.

Another aspect of the present invention provides an apparatus for evaluating effectiveness of a test case. The apparatus includes: a program test module including an error program generator and an error detector, wherein the error program generator receives a target program used for evaluating the effectiveness of the test case and inputs errors to the target program to generate an error program, and the error detector executes the test case on the generated error program to detect the errors; and an evaluation point calculation module for calculating evaluation points of the test case using a ratio of the number of the detected errors to the number of the input errors.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 2 is a flowchart illustrating a method for evaluating the effectiveness of a test case according to an exemplary embodiment of the present invention.

DETAILED DESCRIPTION OF EMBODIMENTS

Figure 1:
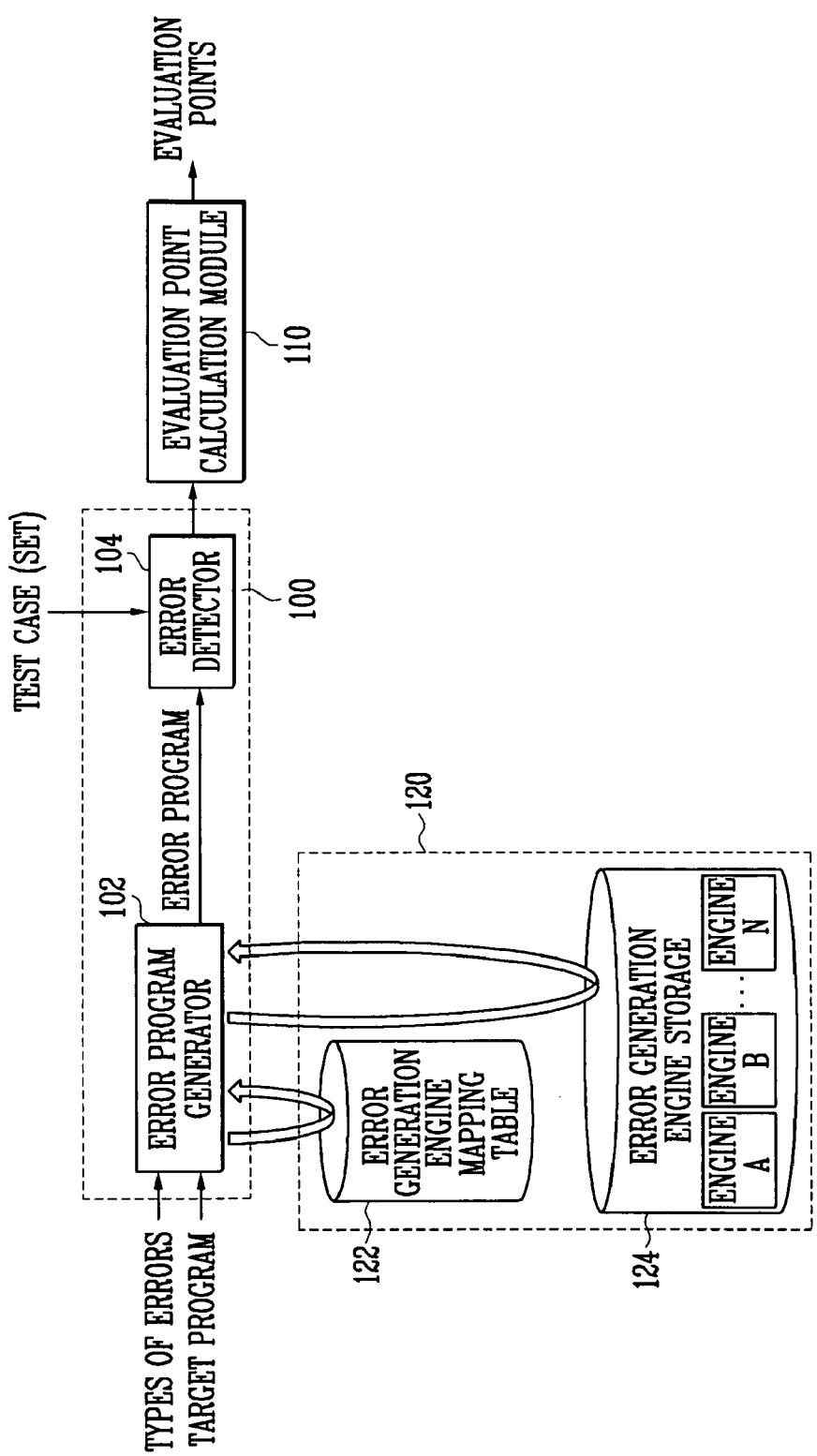
FIG. 1 is a block diagram of an effectiveness evaluation unit of a test case according to an exemplary embodiment of the present invention.

FIG. 1 is a block diagram of an effectiveness evaluation unit of a test case according to an exemplary embodiment of the present invention.

Referring to FIG. 1, the effectiveness evaluation unit of the test case includes a program test module 100, an evaluation point calculation module 110, and a storage module 120. Hereinafter, the construction and operation of the effectiveness evaluation unit of the test case according to the exemplary embodiment of the present invention will be described in detail with reference to FIG. 1.

The program test module 100 includes an error program generator 102 and an error detector 104. The error program generator 102 inputs errors to a target program and generates an error program, and the error detector 104 detects errors from the generated error program.

The target program is used for evaluating the test case. In the present embodiment, when errors are input to the target program, the error program is generated.

The error program generator 102 receives the target program used for evaluating the effectiveness of the test case, inputs errors to the target program to generate the error program, and outputs the generated error program to the error detector 104.

Also, the error program generator 102 may receive at least one type of error among predetermined types of errors, input the received types of errors to the target program, and generate an error program.

Errors to be input to the target program may include, for example, an ambiguity error and a contradiction error. The ambiguity error may be transferred to at least two states when an equal incident occurs under an equal condition, and the contradiction error describes impossible conditions. For brevity, a description of various other errors that may occur in programs will be omitted here. However, the above-described ambiguity error and contradiction error will now be described in detail with specific examples.

The ambiguity error will be described in more detail with reference to Table 1.

TABLE 1

| Present state | Condition | Next state |
|---|---|---|
| S1 | A == 5 | S1 |
|  | A == 5 && B == 3 | S2 |

Referring to Table 1, in the present state 'S1', when A is 5 and B is 3, both of two conditions shown in Table 1 are satisfied. Accordingly, a system cannot determine if the next state should remain to be the state 'S1' as in the present state or be changed to a state 'S2'.

The contradiction error will be described in more detail with reference to Table 2.

TABLE 2

| Present state | Condition | Next state |
|---|---|---|
| S1 | A > 5 && A < 5 | S2 |
| S1 | B == 3 || B! = 3 | S2 |

Referring to Table 2, in the present state 'S1', since none satisfies a first condition where A is larger than 5 and simultaneously smaller than 5, a system makes an error during processing of a program to which the first condition is input. Similarly, it is impossible to satisfy a second condition where B is 3 and simultaneously is not 3, so that the system makes an error during processing of a program to which the second condition is input.

Referring again to FIG. 1, the error program generator 102 may load an error generation engine corresponding to the received types of errors from an error generation engine storage 124 of the storage module 120, drive the loaded error generation engine to input errors to the target program, and generate an error program.

Also, the error program generator 102 may load the error generation engine corresponding to the received types of errors from the error generation engine storage 124 by referring to an error generation engine mapping table 122, drive the loaded error generation engine to input errors to the target program, and generate the error program.

The error detector 104 executes the test case on the error program output from the error program generator 102 and detects errors. In general, the test case may include a test script for indicating a test procedure, test data required for performing the test script, and a test oracle for determining the presence or absence of an error as a test result. The test oracle is a mechanism or an apparatus for calculating the result of an estimation test performed on the test case or confirming if an actual result is correct.

Also, the error detector 104 outputs the number of detected errors and information on the types of errors to the estimation point calculation module 110.

The evaluation point calculation module 110 compares the number of errors input by the error program generator 102 with the number of errors detected by the error detector 104 and calculates evaluation points of the test case.

For example, when 10 errors are input by the error program generator 102 and 7 errors are detected by the error detector 104 using a test case A, the test case A has 70 evaluation points $((7/10) \times 100 = 70)$.

Also, the evaluation point calculation module 110 may compare errors input by the error program generator 102 with errors detected by the error detector 104 in consideration of the number of errors, the types of errors, and predetermined weight values for the types of errors and calculates evaluation points of a test case.

For example, it is assumed that 5 ambiguity errors and 5 contradiction errors are input by the error program generator 102 to the target program, the weight value of an ambiguity error is 3 and the weight value of a contradiction error is 1. In this case, when 3 ambiguity errors and 2 contradiction errors are detected by the error detector 104 using a test case B, the test case B has 55 evaluation points $((3 \times 3 + 2 \times 1)/(5 \times 3 + 5 \times 1) \times 100 = 55)$.

The storage module 120 includes the error generation engine mapping table 122 and the error generation engine storage 124.

The error generation engine mapping table 122 registers information on the error generation engine stored in the error generation engine storage 124. The information on the error generation engine includes information on the types of errors generated by the error generation engine, information on a position where the error generation engine is stored, information on an execution file name of the error generation engine, and information on programming languages used in generating the error generation engine.

The error generation engine storage 124 stores the error generation engine for generating errors to be input to the target program.

FIG. 2 is a flowchart illustrating a method for evaluating the effectiveness of a test case according to an exemplary embodiment of the present invention. Hereinafter, a method for evaluating the effectiveness of a test case will be described in more detail with reference to FIGS. 1 and 2.

In step 200, the error program generator 102 receives a target program and the types of errors to be input to the target program and proceeds to the step 202.

In step 202, the error program generator 102 searches information on an error generation engine corresponding to the received types of the errors from the error generation engine mapping table 122 and proceeds to the step 204.

In step 204, the error program generator 102 loads the error generation engine corresponding to the received types of the errors from the error generation engine storage 124 based on the information on the error generation engine registered in the error generation engine mapping table 122, and proceeds to the step 206.

In step 206, the error program generator 102 determines the position and number of the errors to be input to the target program and enters step 208. In this case, a user may input the number of the errors to be input to the target program, and the error program generator 102 may search the target program and determine a block to which the received types of the errors can be applied. That is, since the ambiguity error or contradiction error shown in Tables 1 and 2 occur in conditional sentences, the error program generator 102 searches the position of a conditional sentence from the target program and determines the position where the errors will be input.

In step 208, the error program generator 102 drives the error generation engine loaded in step 204, inputs the errors to the target program, generates an error program, and outputs the generated error program to the error detector 104.

In step 210, the error detector 104 executes a test case on the error program output from the error program generator 102, detects errors, and outputs information on the detected errors to the evaluation point calculation module 110. In this case, a single test case or a plurality of test cases may be executed. Also, a test case set including a plurality of similar test cases for performing various tests may be executed on a single program. For example, the test case set may include several test cases for performing various tests in an equal usable environment, such as test cases for testing a device driver embedded in a portable terminal according to the usable environment of the device driver. When the error detector 104 executes a test case set in step 210, a block in which an error is detected by any one test case of the test case set may be skipped during execution of the remaining test cases. As a result, it is possible to reduce a time required for evaluating the effectiveness of the test case set.

In step 212, the evaluation point calculation module 110 calculates evaluation points of the test case based on the information on the detected errors output from the error detector 104 and information on errors received by the error program generator 102. That is, the evaluation point calculation module 110 compares the number of the errors input by the error program generator 102 with the number of the errors detected by the error detector 104 and calculates the evaluation points of the test case. Also, the evaluation point calculation module 110 may compare the errors input by the error program generator 102 with the errors detected by the error detector 104 in consideration of the number of the errors, the types of the errors, and predetermined weight values for the types of errors, and calculate the evaluation points of the test case. When the test case set is executed in step 210, the evaluation point calculation module 110 may calculate evaluation points of the entire test case set.

As described above, the present invention provides a method and apparatus for evaluating the error detection capability of a test case used for a program test. Also, the capability of the test case to detect errors that are expected to be frequent according to the usable environment of a program is evaluated, thus enabling development of more stable programs.

In the drawings and specification, there have been disclosed typical preferred embodiments of the invention and, although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A method for evaluating effectiveness of a test case, the method comprising:
    receiving a target program used for evaluating the effectiveness of the test case;
    generating an error program by inputting errors to the target program;
    detecting the errors by executing the test case on the generated error program; and
    calculating evaluation points of the test case using a ratio of the number of the detected errors to the number of the input errors,
    wherein calculating the evaluation points includes giving a weight value according to predetermined types of errors, and calculating the evaluation points of the test case in consideration of the number of the detected errors and weight values given to the detected errors according to respective types of errors.

2. An apparatus for evaluating effectiveness of a test case, comprising:
    a program test module including an error program generator and an error detector, wherein the error program generator receives a target program used for evaluating the effectiveness of the test case and inputs errors to the target program to generate an error program, and the error detector executes the test case on the generated error program to detect the errors; and
    an evaluation point calculation module for calculating evaluation points of the test case using a ratio of the number of the detected errors to the number of the input errors,
    wherein the evaluation point calculation module gives a weight value according to a predetermined type of error and calculates the evaluation points of the test case in consideration of the number of the detected errors and weight values given to the detected errors according to the types of the detected errors.

* * * * *